(12) United States Patent
Banerjee

(10) Patent No.: US 8,347,041 B2
(45) Date of Patent: Jan. 1, 2013

(54) SYSTEM AND METHOD TO PRESERVE AND RECOVER UNWRITTEN DATA PRESENT IN DATA CACHE OF A DISK SUBSYSTEM ACROSS POWER OUTAGES

(75) Inventor: Arindam Banerjee, Bangalore (IN)

(73) Assignee: LSI Corporation, Milpitas, CA (US)

( * ) Notice: Subject to any disclaimer, the term of this patent is extended or adjusted under 35 U.S.C. 154(b) by 853 days.

(21) Appl. No.: 12/348,142

(22) Filed: Jan. 2, 2009

(65) Prior Publication Data

US 2010/0174870 A1     Jul. 8, 2010

(51) Int. Cl.
*G06F 12/00* (2006.01)
(52) U.S. Cl. .................. 711/143; 711/E12.019
(58) Field of Classification Search .................. None
See application file for complete search history.

(56) References Cited

U.S. PATENT DOCUMENTS

| | | | | |
|---|---|---|---|---|
| 5,519,831 A | * | 5/1996 | Holzhammer ............. | 714/22 |
| 5,748,874 A | * | 5/1998 | Hicksted et al. .......... | 714/24 |
| 5,774,643 A | * | 6/1998 | Lubbers et al. ........... | 714/20 |
| 6,295,577 B1 | * | 9/2001 | Anderson et al. ......... | 711/113 |
| 6,490,659 B1 | * | 12/2002 | McKean et al. .......... | 711/141 |
| 7,610,445 B1 | * | 10/2009 | Manus et al. ............. | 711/113 |
| 2002/0133735 A1 | * | 9/2002 | McKean et al. .......... | 714/5 |
| 2002/0156983 A1 | * | 10/2002 | Jones et al. .............. | 711/143 |
| 2007/0124542 A1 | * | 5/2007 | Ven ......................... | 711/143 |
| 2010/0332739 A1 | * | 12/2010 | Haneda et al. .......... | 711/103 |

\* cited by examiner

*Primary Examiner* — Edward Dudek, Jr.
*Assistant Examiner* — John P Fishburn
(74) *Attorney, Agent, or Firm* — Raj Abhyanker, P.C.

(57) ABSTRACT

Disclosed are a system and method to preserve and recover unwritten data present in data cache of a disk subsystem across power outages. In one embodiment, a method of a controller is described. The method includes applying a write-back technique between a host server and a data store, accessing a dirty data in a cache memory during a power outage. The method may apply an algorithm for efficiently offloading the dirty data to a non-volatile storage device during the power outage. In addition the method may apply the algorithm to efficiently transfer the dirty data from the non-volatile storage device to the data store when power is restored.

20 Claims, 5 Drawing Sheets

SYSTEM AND METHOD TO PRESERVE AND RECOVER UNWRITTEN DATA PRESENT IN DATA CACHE OF A DISK SUBSYSTEM ACROSS POWER OUTAGES

FIELD OF TECHNOLOGY

Disclosed are a system and method to preserve and recover unwritten data present in data cache of a disk subsystem across power outages.

BACKGROUND

A write-back and/or write caching technique may be a data transfer method in which an acknowledgement is sent to a host server from a disk array controller when data arrives from the host server to the controller's cache memory. This data may be referred to as "dirty data" till the point when it is written to the data store (e.g., the backend disks).

The dirty data may be an information arriving from the host server to the cache memory prior to transport to a data store. For example, the dirty data may be the information which has arrived from the host server to the cache memory on the controller but has not been written to the data store. The dirty data may be also referred to as "unwritten" data as far as the controller is concerned and is stored in units of cache blocks within the controller cache memory. At the time of a power outage, the dirty data in the cache memory may not be transferred to the data store and may be lost.

SUMMARY

Disclosed are a system and method to preserve and recover unwritten data present in data cache of a disk subsystem across power outages. In one aspect, a method of a controller is described. A write-back technique between a host server and a data store is used in the method. During a power outage, a dirty data is accessed in a cache memory. Next, an algorithm for efficiently offloading the dirty data to a non-volatile storage device during the power outage is applied. The algorithm is applied to efficiently transfer the dirty data from the non-volatile storage device to the data store when power is restored.

In another aspect, a system is described. The system includes a host server, a data store (disk array), a cache memory which comprise a dirty data, a non-volatile storage device and a disk array controller. The non-volatile storage device stores the dirty data during a power outage. The controller is coupled between the host server and the data store to apply optimal algorithm to access the dirty data in the cache memory during the power outage and to offload the dirty data to the non-volatile storage device. In addition, the controller may apply an algorithm to optimally transfer the dirty data from the non-volatile storage device to the data store when power is restored. A write-back technique is a transfer method in which an acknowledgement is sent to the host server from the disk array controller when the dirty data may arrive from the host server to the cache memory.

In yet another aspect, a dirty data block is optimally accessed in a cache memory during a power outage. The dirty data is stored in a non-volatile storage device during the power outage. The dirty data is transferred from the non-volatile storage device to a data store when power is restored.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other aspects and example embodiments are provided in the Drawings and the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system and method to preserve and recover unwritten data present in data cache of a disk subsystem across power outages.

Although the present embodiments have been described with reference to specific example embodiments, it will be evident that various modifications and changes may be made to these embodiments without departing from the broader spirit and scope of the various embodiments.

Figure 1:
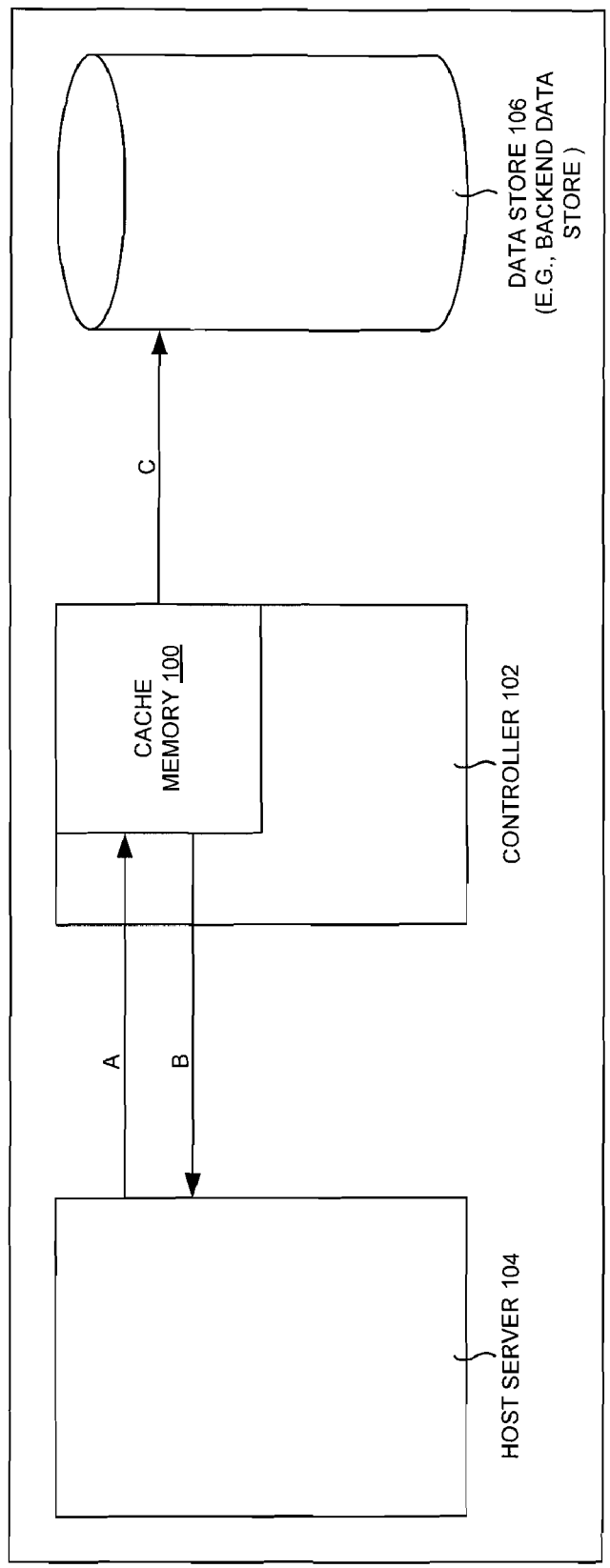
FIG. 1 is a system view of a write-back technique between a host server and a data store, according to one embodiment.

FIG. 1 is a system view of a write-back technique between a host server and a data store (disk array), according to one embodiment. Particularly, FIG. 1 illustrates a cache memory 100, a controller 102, a host server 104, and a data store 106, according to one embodiment.

The cache memory 100 may be a high-speed SDRAM memory attached to the controller board. The cache memory 100 may be used for retaining data in order to achieve high speed read/write operations. The controller 102 (e.g., disk array controller) may be coupled between the host server 104 and the data store 106 to apply an optimal algorithm to access the dirty data in the cache memory 100 during the power outage. The controller 102 may control the transfer of data from a computer (e.g., the host server 104) to a peripheral device (e.g., the data store 106) and vice versa. The host server 104 may send the dirty data to the controller 102. The data store (e.g., may be the backend data store) may store the data or the IO from the host server 104.

In operation A, the host server 104 may send data to the controller 102. In operation B, the cache memory 100 of the controller 102 may receive data and send back an acknowledgement to the host server 104 and may mark data as the dirty data. In operation C, the dirty data may be written to the data store 106 through a background sync operation. After the data is written, the dirty data may be marked as the clean data.

In an example embodiment, the host server 104 may communicate with the controller 102. The controller 102 may include the cache memory 100. The controller 102 may communicate with the data store 106 (e.g., may be the backend data store).

In one embodiment, the write-back technique may be applied between the host server 104 and the data store 106. The dirty data in the cache memory 100 may be accessed during the power outage. The algorithm may be applied for efficiently offloading the dirty data to the non-volatile storage device 206 during the power outage. The algorithm may be applied to efficiently transfer the dirty data from the non-volatile storage device 206 to the data store 106 when power is restored. The write-back technique may be the transfer method in which the acknowledgement is sent to the host server 104 from the controller 102 when the data may arrive from the host server 104 to the cache memory 100. The cache memory 100 may include the dirty data. The non-volatile storage device 206 may store the dirty data during the power outage. The controller 102 may apply optimal algorithm to access the dirty data in the cache memory 100 during the power outage and may offload the dirty data to the non-volatile storage device 206 and may apply the algorithm to optimally transfer the dirty data from the non-volatile storage device 206 to the data store 106 when power is restored. The write-back technique may be the transfer method in which the acknowledgement is sent to the host server 104 from the controller 102 when the dirty data may arrive from the host server 104 to the cache memory 100. The write-back technique may be applied between the host server 104 and the data store 106.

Figure 2:
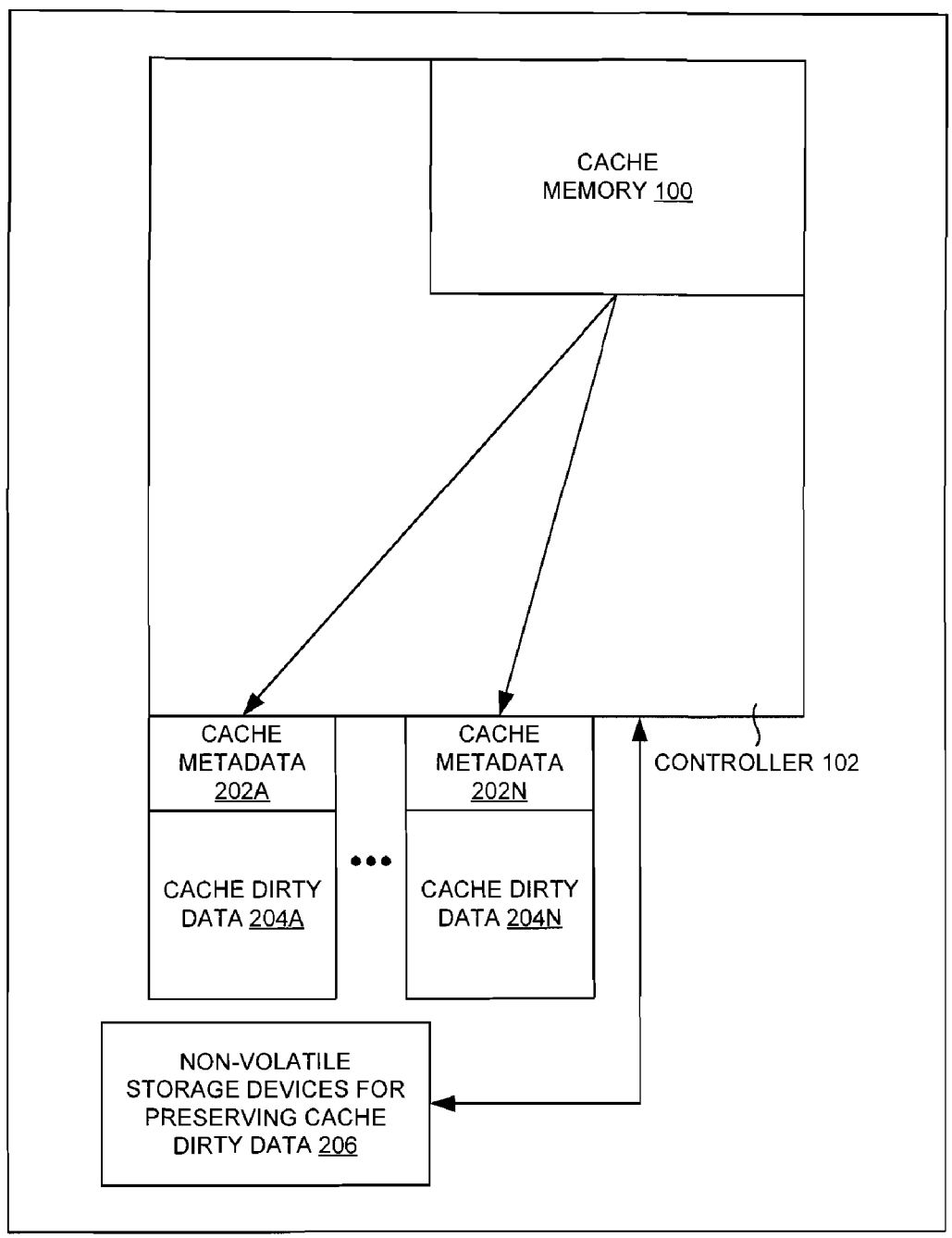
FIG. 2 is a systematic view of a data flow during a cache backup in a non-volatile storage device, according to one embodiment.

FIG. 2 is a systematic view of a data flow during a cache backup in a non-volatile storage device, according to one embodiment. Particularly, FIG. 2 illustrates the cache memory 100, the controller 102, a cache metadata 202A-N, a cache dirty data 204A-N, and non-volatile storage devices for preserving cache dirty data 206, according to one embodiment.

The cache metadata 202A-N may be the metadata information on the cache memory 100 that may be stored in a backup volume on the cache backup devices. The cache dirty data 204A-N may the un-written data to the data store 106. The non-volatile storage devices 206 for preserving cache dirty data may store the dirty data during the power outage.

In an example embodiment, the controller 102 may include the cache memory 100. The cache memory 100 may include the cache metadata 202A-N, and the cache dirty data 204A-N. The cache memory 100 may communicate with the non-volatile storage devices 206 for preserving cache dirty data.

In one embodiment, the dirty data may be the information arriving from the host server 104 to the cache memory 100 prior to transport to the data store 106. A parallel access of the non-volatile storage devices 206 may be ensured to improve backup performance when the backup time is limited. The maximum sequential access within the non-volatile storage device 206 may be ensured to improve IO throughput when the backup time is limited. The restore time may be minimized to activate the write-back technique within the threshold amount of time. The data to be preserved may be packed and/or laid out in the order of the volume number and the logical block address. The algorithm may access multiple non-volatile storage devices in parallel by creating a volume group and/or a disk group by using the capacity of the non-volatile storage devices. The data striping technique may be used to achieve parallelism. A logical volume that may have the portion of the backup data on each of the storage devices may be created during the backup operation on the volume group or disk group. Cache blocks may be packed from different physical locations in the cache memory 100 in the particular order based on both the volume number to which the cache block may correspond to and the logical block address within the volume.

The packing may enable only the cache blocks which may include the dirty data to be stored together in the non-volatile storage device 206 without wasting storage space. The cache block may be located in any physical location of the cache memory 100. The algorithm may avoid storing the packing related information within the storage device so as to ensure maximum sequential access. By reading the entire metadata information from the non-volatile storage device 206 the algorithm may intelligently recreate the packing information whenever an interruption may occur during the backup and/or restore. The packing information may be critical to locate the respective cache block's physical location within the non-volatile storage device 206. Storing the packing information in the non-volatile storage device 206 may result in small random access (IO) to the non-volatile storage device 206. The algorithm may access the non-volatile storage device 206 in the sequential manner to provide maximum throughput during the backup and/or restore operation. The metadata information may also be stored in logical volumes created during the backup operation on the non-volatile storage device 206 thereby ensuring minimum read times. The metadata information may maintain the state of the dirty cache blocks within the cache memory 100 when the power outage first occurred.

The algorithm may restore the dirty data in the context of the background cache sync operation to ensure that the power on to the host IO access time may be similar to the normal boot time of the controller 102. The background cache sync operation may be performed after the controller 102 initialization. The data restoration post system initialization may avoid effect to the power on to the host IO response time. The interrupted write data operation may be handled efficiently during a system initialization phase without affecting the power on to the host IO response time by ensuring the cache blocks corresponding to interrupted writes are laid out contiguously within the non-volatile storage device 206. The cache blocks corresponding to interrupted writes may be located in any physical location of the cache memory 100. Storing the cache block corresponding to interrupted writes contiguously within the non-volatile storage devices 206 may enable all such cache blocks to be restored through one and/or more sequential read operations. An interrupted write may be the unfinished in-flight write operation that was in progress between the cache memory 100 and the data store 106 when the power outage occurred.

Interrupted writes need to be completed at system initialization to maintain RAID data parity consistency. The algorithm may also allow restoration of the dirty data in the context of the host server 104 initiated I/O. The host initiated IO may be another data transport which arrives from the host server 104 and is targeted to the same logical unit within the data store 106 as the previous dirty data which may be stored in the non-volatile storage device 206 during backup. The host initiated IO may be allowed only after system initialization has completed.

The algorithm may provide the minimal restore time by using an efficient data layout within the non-volatile storage devices 206. The efficient data layout may be achieved by ordering the cache blocks in the non-volatile storage device 206 sorted on their volume number and the logical block address within the volume thereby synchronizing the data layout with the cache sync operation algorithm. Synchronizing the data layout with the cache sync operation may enable sequential access to the non-volatile storage device 206 during data restore. The algorithm may also allow sequential access to the data store 106 during the restore operation thereby minimizing expensive seek operations on the data store 106.

The algorithm may invalidate the dirty data which may be read from the non-volatile storage device 206 when the power is restored. The invalidation may be achieved through marking the bit in the bitmap table and mapping the bit to the corresponding cache block related metadata information. The invalidation may require updating specific fields within the metadata information stored within the non-volatile storage devices 206. The invalidation of the data may be required so that a cache block is not attempted to be restored again from the backup devices in cases of an interruption (e.g., another power outage) during restore operation. Updating specific fields of the metadata information within the non-volatile storage devices 206 may result in the expensive read-write-modify operations on the storage device. The bitmap technique may enable avoiding the expensive read-modify-write operation.

Figure 3:
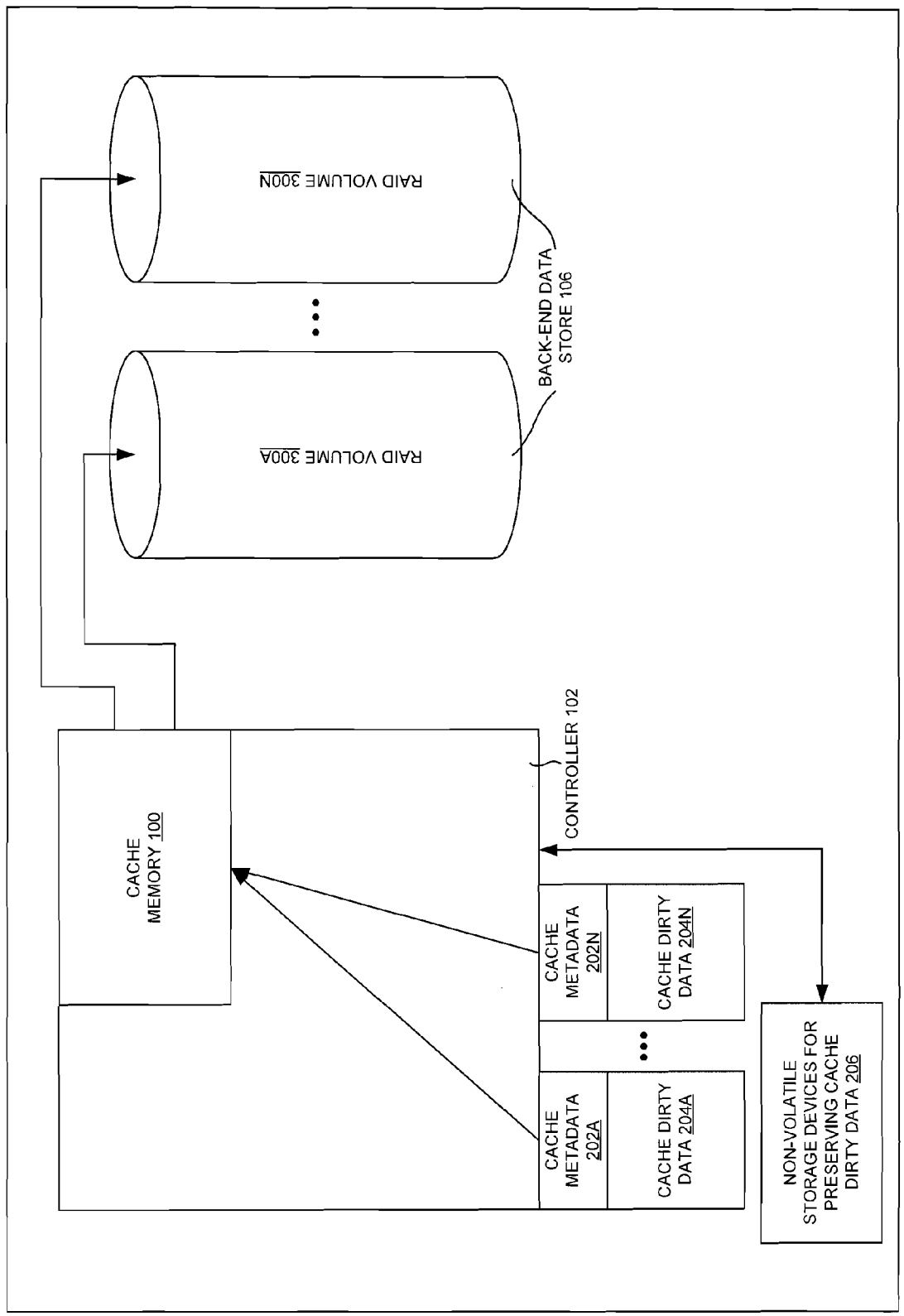
FIG. 3 is a systematic view of the data flow during a power restore in the non-volatile storage device, according to one embodiment.

FIG. 3 is a systematic view of the data flow during a power restore from the non-volatile storage device 206 to the data store 106, according to one embodiment. Particularly, FIG. 3 illustrates the cache memory 100, the controller 102, the data store 106, the cache metadata 202A-N, the cache dirty data 204A-N, the non-volatile storage devices for preserving cache dirty data 206, and RAID volumes 300A-N, according to one embodiment. The RAID volumes 300A-N (e.g., Redundant Array of Independent Disks) may be a technology that employs the simultaneous use of two or more hard disk drives to achieve greater levels of performance, reliability, and/or larger data volume.

In an example embodiment, the controller 102 may include the cache memory 100. The cache memory 100 may include the cache metadata 202A-N, and the cache dirty data 204A-N. The cache memory 100 may communicate with the non-volatile storage devices 206 for preserving the cache dirty data 204A-N. The controller 102 may communicate with the data store 106. The data store 106 may include the RAID volumes 300A-N.

Figure 4:
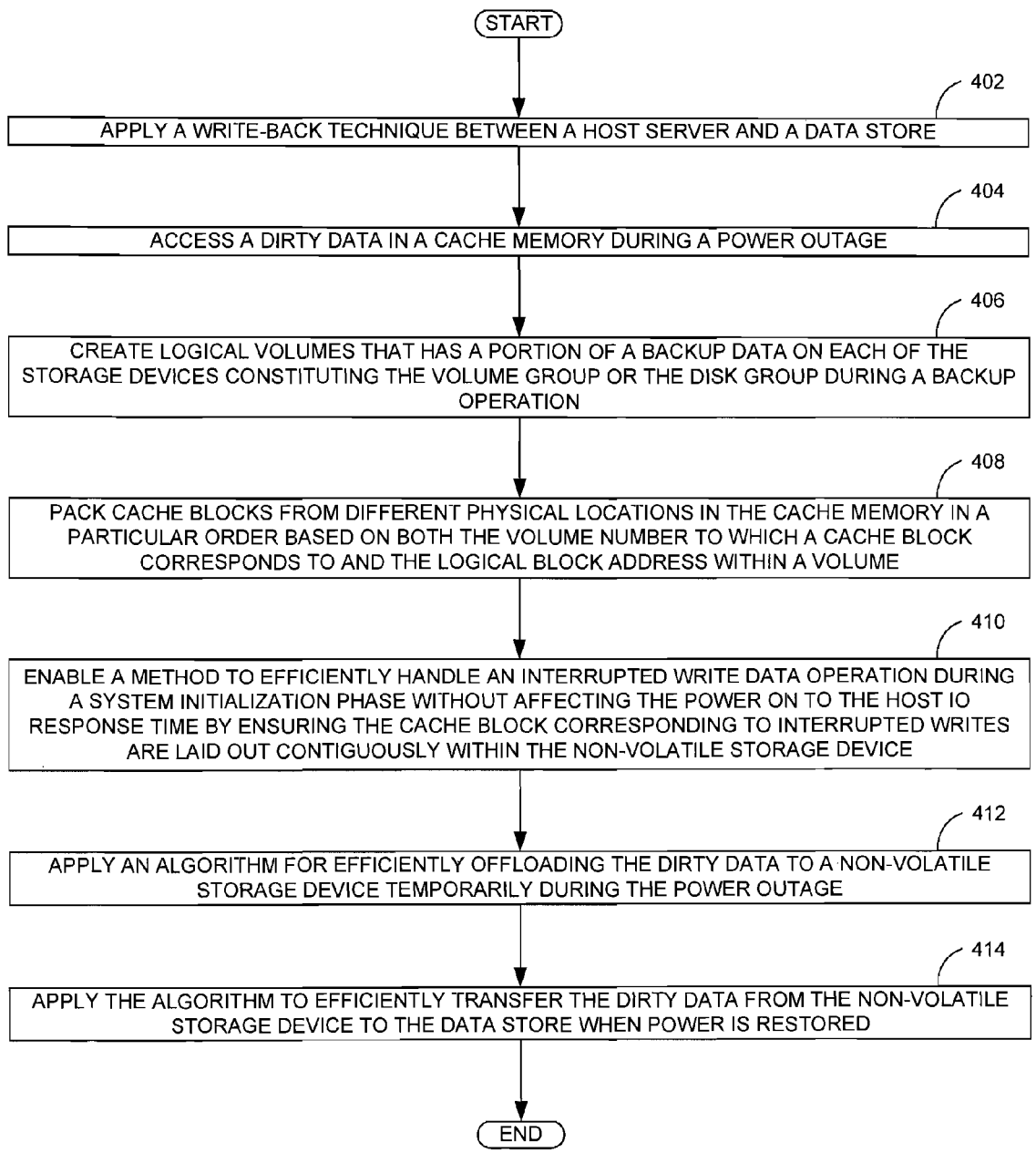
FIG. 4 is a process flow of applying a write-back technique between the host server and the data store, according to one embodiment.

FIG. 4 is a process flow of applying a write-back technique between the host server and the data store, according to one embodiment. In operation 402, a write-back technique may be applied between the host server 104 and the data store 106. In operation 404, a dirty data in a cache memory (e.g., the cache memory 100 of FIG. 1) may be accessed during a power outage. In operation 406, logical volumes that may have a portion of a backup data on each of the storage devices constituting the volume group or the disk group may be created during a backup operation.

In operation 408, cache blocks may be packed from different physical locations in the cache memory 100 in a particular order based on the volume number to which a cache block corresponds to and/or the logical block address within a volume. The packing may enable the cache blocks which may include the dirty data to be stored together in the non-volatile storage device 206 without wasting storage space. The cache block may be located in any physical location of the cache memory 100. The algorithm may avoid storing the packing related information within the storage device so as to ensure maximum sequential access. By reading the entire metadata information from the non-volatile storage device 206 the algorithm may intelligently recreate the packing information every time there is an interruption during a backup and/or restore. The packing information may be critical to locate the respective cache block's physical location within the non-volatile storage device 206.

Storing the packing information in the non-volatile storage device 206 may result in small random access to the non-volatile storage device 206. The algorithm may access the non-volatile storage device 206 in a sequential manner to provide maximum throughput during the backup and/or restore operation. The metadata information may also be stored in logical volumes created during the backup operation on the non-volatile storage device 206 thereby ensuring minimum read times. The metadata information may maintain a state of the dirty cache blocks within the cache memory 100 when the power outage first occurred.

The algorithm may restore the dirty data in the context of a cache sync operation to ensure that the power on to a host IO access time may be similar to the normal boot time of the controller 102. The cache sync operation may be performed after the controller 102 initialization. The data restoration post system initialization may avoid effect to the power on to a host IO response time.

In operation 410, a method to handle interrupted write data operation efficiently during a system initialization phase without affecting the power on to the host IO response time may be enabled by ensuring the cache blocks corresponding to the interrupted writes are laid out contiguously within the non-volatile storage device 206.

The cache blocks corresponding to interrupted writes may be located in any physical location of the cache memory 100. Storing the cache blocks corresponding to interrupted writes contiguously within the non-volatile storage devices 206 may enable all such cache blocks to be restored through one and/or more sequential read operations. An interrupted write may be an unfinished in-flight write operation that may be in progress between the cache memory 100 and the data store 106 when the power outage occurred. Interrupted writes may have to be completed at system initialization to maintain RAID data parity consistency.

The algorithm may allow restoration of the dirty data in the context of the host initiated IO. The host initiated IO may be another data transport which arrives from the host server 104. The host initiated IO may be targeted to the same logical unit within the data store 106 as the previous dirty data which may be stored in the non-volatile storage device 206 during backup. The host initiated IO may be allowed only after system initialization. The algorithm may provide a minimal restore time by using an efficient data layout within the non-volatile storage devices 206.

The efficient data layout may be achieved by ordering the cache blocks in the non-volatile storage device 206 sorted on their volume number and the logical block may be addressed within the volume thereby synchronizing the data layout with the cache sync operation algorithm. Synchronizing the data layout with the cache sync operation may enable sequential access to the non-volatile storage device 206 during data restore. The algorithm may also allow sequential access to the data store 106 during a restore operation thereby minimizing expensive seek operations on the data store 106.

The algorithm may invalidate the dirty data which may be read from the non-volatile storage device 206 when the power is restored. An invalidation may be achieved through marking a bit in a bitmap table and mapping the bit to the corresponding cache block related metadata information. The invalidation may require updating specific fields within the metadata information stored within the non-volatile storage devices 206. Updating specific fields of the metadata information within the non-volatile storage devices 206 may result in expensive read-write-modify operations on the storage device. A bitmap technique may enable avoiding the expensive read-modify-write operation.

In operation 412, an algorithm may be applied for efficiently offloading the dirty data to a non-volatile storage device 206 during the power outage. In operation 414, the algorithm may be applied to efficiently transfer the dirty data from the non-volatile storage device 206 to the data store 106 when power is restored. The write-back technique may be a transfer method in which an acknowledgement is sent to the host server 104 from the controller 102 when data may arrive from the host server 104 to the cache memory 100.

The dirty data may be the information arriving from the host server 104 to the cache memory 100 prior to transport to the data store 106. A parallel access of the non-volatile storage devices 206 may be ensured to improve backup performance when a backup time is limited. A maximum sequential access within the non-volatile storage device 206 may be ensured to improve IO throughput when the backup time is limited. A restore time may be minimized to activate the write-back technique within a threshold amount of time. The data may be packed and laid out in an order of a volume number and/or a logical block address. The algorithm may access multiple non-volatile storage devices 206 in parallel by creating a volume group or a disk group. A data striping technique may be used to achieve parallelism.

Figure 5:
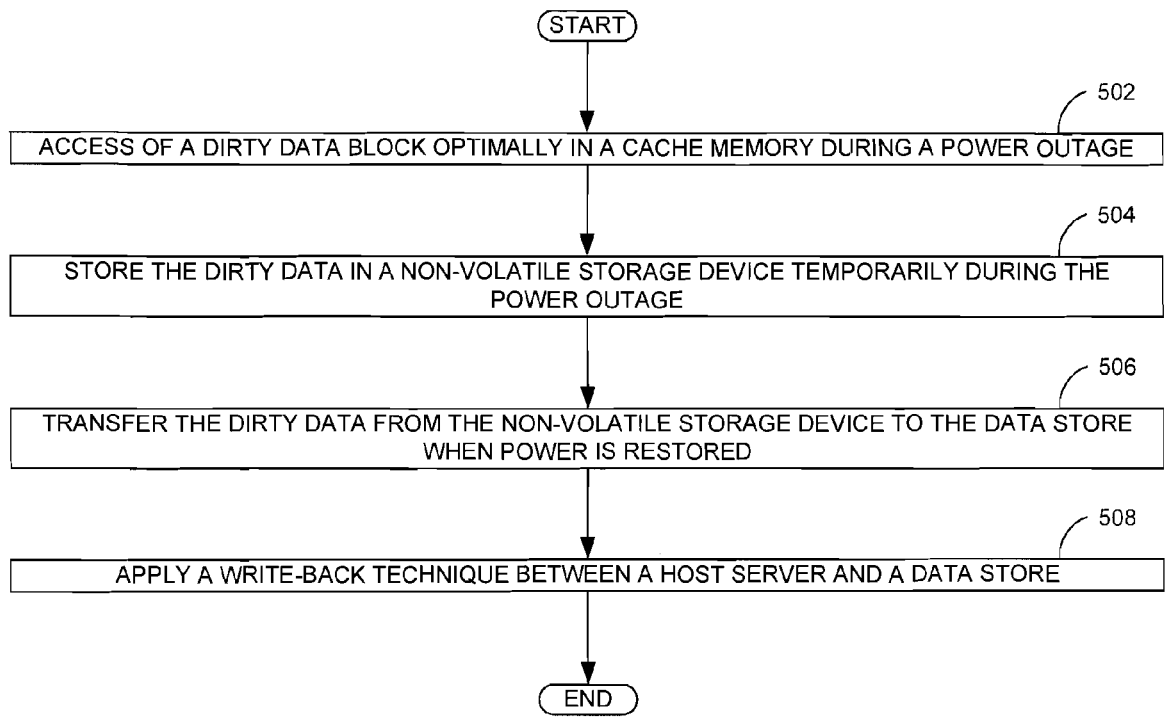
FIG. 5 is a process flow of accessing a dirty data block optimally in a cache memory during a power outage, according to one embodiment.

FIG. 5 is a process flow of accessing a dirty data block optimally in a cache memory during a power outage, according to one embodiment. In operation 502, a dirty data block in the cache memory 100 may be accessed optimally during a power outage. In operation 504, the dirty data may be stored in a non-volatile storage device 206 during the power outage. In operation 506, the dirty data may be transferred from the non-volatile storage device 206 to the data store 106 when power is restored. In operation 508, a write-back technique may be applied between a host server 104 and a data store (e.g., may be the backend data store 106).

In an example embodiment, a network administrator John may discover that power has been lost to a data center of Acme Corporation where he is employed. An employee Jane may have been saving information critical to her business when the power outage occurred. A UPS coupled to the disk subsystem in the data center of Acme Corporation may have failed. As a result, Jane may have lost the data being backed up. She may be very upset. One embodiment of this invention may enable John to purchase a disk array which includes a disk array controller that transfers data to a non-volatile storage device when power is shut off (e.g., a flash drive) and retrieves it seamlessly without affecting Jane's ability to access the data when power is restored. That way, Jane's valuable work can be preserved.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a controller coupled between a host server and a data store comprising:
   solely packing blocks of a cache memory of the controller corresponding to a dirty data in an order of a volume number and a logical block address within a volume, the dirty data being data from the host server prior to being written to the data store;
   backing up the packed blocks of the cache memory corresponding to the dirty data in a intermediary backup non-volatile storage device distinct from both the cache memory and the data store and storing packing information in the intermediary backup non-volatile storage device, with storing of the packing information at the cache memory being avoided;
   maintaining, in the packing information, a state of the packed blocks of the cache memory corresponding to the dirty data immediately prior to a power outage during the power outage; and
   sequentially accessing the packed blocks of the cache memory corresponding to the dirty data in the intermediary backup non-volatile storage device based on the packing information to transfer the dirty data to the data store following restoration of power.

2. The method of claim 1, wherein when there is a plurality of intermediary backup non-volatile storage devices, the method further comprises:
   ensuring parallel access to each of the plurality of intermediary backup non-volatile storage devices during backup of the dirty data and the transfer thereof to the data store.

3. The method of claim 2, further comprising creating one of: a volume group and a disk group based on the plurality of intermediary backup non-volatile storage devices.

4. The method of claim 2, further comprising utilizing a data striping technique to achieve parallelism.

5. The method of claim 3, further comprising creating logical volumes having a portion of backup data on each of the plurality of intermediary backup non-volatile storage devices constituting the volume group or the disk group during a backup operation.

6. The method of claim 1, wherein solely packing the blocks of the cache memory corresponding to the dirty data in the order of the volume number and the logical block address comprises packing the blocks from different physical locations in the cache memory in the order.

7. The method of claim 1, further comprising:
   recreating the packing information during every period of interruption during at least one of a backup and a restore operation; and
   locating a physical location of a block of the cache memory corresponding to the dirty data within the intermediary backup non-volatile storage device using the packing information.

8. The method of claim 1, further comprising:
   transferring the dirty data from the intermediary backup non-volatile storage device to the data store based on a cache synchronization operation.

9. The method of claim 1, further comprising:
   ensuring that the packed blocks of the cache memory corresponding to the dirty data and associated with interrupted write operations are laid out contiguously within the intermediary backup non-volatile storage device.

10. The method of claim 1, further comprising:
allowing the transfer of the dirty data to the data store in a context of an Input/Output (IO) initiated by the host server.

11. The method of claim 1, further comprising:
invalidating the dirty data within the intermediary backup non-volatile storage device after the transfer of the dirty data to the data store.

12. The method of claim 11, wherein the invalidation comprises:
updating specific fields within the packing information stored within the intermediary backup non-volatile storage device; and
avoiding an expensive read-modify-write operation during the invalidation by utilizing a bitmap technique.

13. A system comprising:
a host server;
a data store;
a controller comprising a cache memory configured to include dirty data corresponding to data from the host server prior to being written to the data store; and
a intermediary backup non-volatile storage device distinct from both the data store and the cache memory,
wherein the controller is configured to enable:
solely packing blocks of the cache memory corresponding to the dirty data in an order of a volume number and a logical block address within a volume;
backing up the packed blocks of the cache memory corresponding to the dirty data in the intermediary backup non-volatile storage device and storing packing information therein, with storing of the packing information at the cache memory being avoided;
maintaining, in the packing information, a state of the packed blocks of the cache memory corresponding to the dirty data immediately prior to a power outage during the power outage; and
sequentially accessing the packed blocks of the cache memory corresponding to the dirty data in the intermediary backup non-volatile storage device based on the packing information to transfer the dirty data to the data store following restoration of power.

14. The system of claim 13, wherein when the system comprises a plurality of intermediary backup non-volatile storage devices, the controller is further configured to ensure parallel access to each of the plurality of intermediary backup non-volatile storage devices during backup of the dirty data and the transfer thereof to the data store.

15. The system of claim 14, wherein the controller is further configured to enable creation of one of: a volume group and a disk group based on the plurality of intermediary backup non-volatile storage devices.

16. The system of claim 13, wherein the controller is further configured to enable:
recreating the packing information during every period of interruption during at least one of a backup and a restore operation; and
locating a physical location of a block of the cache memory corresponding to the dirty data within the intermediary backup non-volatile storage device using the packing information.

17. The system of claim 13, wherein the controller is further configured to enable:
transferring the dirty data from the intermediary backup non-volatile storage device to the data store based on a cache synchronization operation.

18. The system of claim 13, wherein the controller is further configured to enable:
allowing the transfer of the dirty data to the data store in a context of an Input/Output (IO) initiated by the host server.

19. A method of a controller coupled between a host server and a data store comprising:
solely packing blocks of a cache memory of the controller corresponding to a dirty data in an order of a volume number and a logical block address within a volume, the dirty data being data from the host server prior to being written to the data store;
backing up the packed blocks of the cache memory corresponding to the dirty data in a plurality of intermediary backup non-volatile storage devices distinct from both the cache memory and the data store and storing packing information in the plurality of intermediary backup non-volatile storage devices, with storing of the packing information at the cache memory being avoided;
maintaining, in the packing information, a state of the packed blocks of the cache memory corresponding to the dirty data immediately prior to a power outage during the power outage;
sequentially accessing the packed blocks of the cache memory corresponding to the dirty data in the plurality of intermediary backup non-volatile storage devices based on the packing information to transfer the dirty data to the data store following restoration of power; and
ensuring parallel access to each of the plurality of intermediary backup non-volatile storage devices during backup of the dirty data and the transfer thereof to the data store.

20. The method of claim 19, further comprising creating one of: a volume group and a disk group based on the plurality of intermediary backup non-volatile storage devices.

* * * * *